(12) United States Patent
Degiulio et al.

(10) Patent No.: US 10,969,582 B2
(45) Date of Patent: Apr. 6, 2021

(54) HEADS-UP DISPLAY WITH IRRIGATION TROUGH

(71) Applicants: DENSO International America, Inc., Southfield, MI (US); Denso Corporation, Kariya (JP)

(72) Inventors: Dominic Degiulio, Allen Park, MI (US); Roger Yang, Royal Oak, MI (US); Yusuke Matsui, West Bloomfield, MI (US)

(73) Assignees: DENSO INTERNATIONAL AMERICA, INC., Southfield, MI (US); DENSO CORPORATION

( * ) Notice: Subject to any disclaimer, the term of this patent is extended or adjusted under 35 U.S.C. 154(b) by 0 days.

(21) Appl. No.: 16/532,990

(22) Filed: Aug. 6, 2019

(65) Prior Publication Data
US 2021/0041696 A1    Feb. 11, 2021

(51) Int. Cl.
*G02B 27/01* (2006.01)
*B60K 35/00* (2006.01)

(52) U.S. Cl.
CPC .......... *G02B 27/0149* (2013.01); *B60K 35/00* (2013.01)

(58) Field of Classification Search
CPC ............................ G02B 27/0149; B60K 35/00
See application file for complete search history.

(56) References Cited

U.S. PATENT DOCUMENTS

2008/0202905 A1*  8/2008  Juan ................. H01H 13/86
                                              200/302.2

FOREIGN PATENT DOCUMENTS

| JP | 2013141941 A |   | 7/2013  |
|----|--------------|---|---------|
| JP | 2016175584 A | * | 10/2016 |
| JP | 2016175584 A |   | 10/2016 |

\* cited by examiner

*Primary Examiner* — Mark W Regn
(74) *Attorney, Agent, or Firm* — Brooks Kushman P.C.

(57) ABSTRACT

A heads-up display (HUD) system is disclosed in various embodiments. The HUD system includes a window plate defining an opening to enable light emitting from HUD components to pass therethrough. The window plate includes an inner trough wall and an outer trough wall that cooperate to define a trough therebetween that at least partially surrounds the opening. A transparent cover is attached to the window plate and covers the opening. The cover has a perimeter and an overhang portion located along at least a portion of the perimeter. The opening has a center and the overhang portion extends further from the center than the inner trough wall to facilitate liquid traveling across the cover to enter the trough and inhibit the liquid from entering an interface between the cover and the window plate. The outer trough wall can have a raised profile relative to the cover to protect the cover.

20 Claims, 3 Drawing Sheets

HEADS-UP DISPLAY WITH IRRIGATION TROUGH

TECHNICAL FIELD

The present disclosure relates to a heads-up display (HUD) assembly having a trough for irrigation to inhibit contaminants from contaminating the inter components of the HUD assembly.

BACKGROUND

Various automotive vehicles have a heads-up display (HUD) system. In a HUD system, a light source projects a light, which is reflected onto a windshield of the vehicle. The focal point of the light is out beyond the vehicle, enabling the driver of the vehicle to view the light on the windshield without changing focus while looking at the outside environment.

SUMMARY

In one embodiment, a heads-up display (HUD) assembly includes a main case, a window plate, and a transparent cover. The window plate is connected to the main case and defines an opening configured to enable light emitting from HUD components to pass therethrough. The window plate further includes an inner trough wall and an outer trough wall that define a trough therebetween that at least partially surrounds the opening. The transparent cover is attached to the window plate and covering the opening. The cover has a perimeter and an overhang portion located along at least a portion of the perimeter. The overhang portion extends beyond the inner trough wall and is not directly supported from beneath by the window plate to facilitate liquid traveling across the cover to enter the trough and inhibit the liquid from entering an interface between the cover and the window plate.

In another embodiment, a HUD assembly includes a cover having a perimeter, and a window plate supporting the cover from beneath. The window plate has a trough defined about at least a portion of the perimeter of the cover. The trough has an outer trough wall that has a raised profile compared to the cover.

In another embodiment, a vehicular HUD system includes a window plate defining an opening to enable light emitting from HUD components to pass therethrough. The window plate includes an inner trough wall and an outer trough wall that cooperate to define a trough therebetween that at least partially surrounds the opening. A transparent cover is attached to the window plate and covers the opening. The cover has a perimeter and an overhang portion located along at least a portion of the perimeter. The opening has a center and the overhang portion extends further from the center than the inner trough wall to facilitate liquid traveling across the cover to enter the trough and inhibit the liquid from entering an interface between the cover and the window plate.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
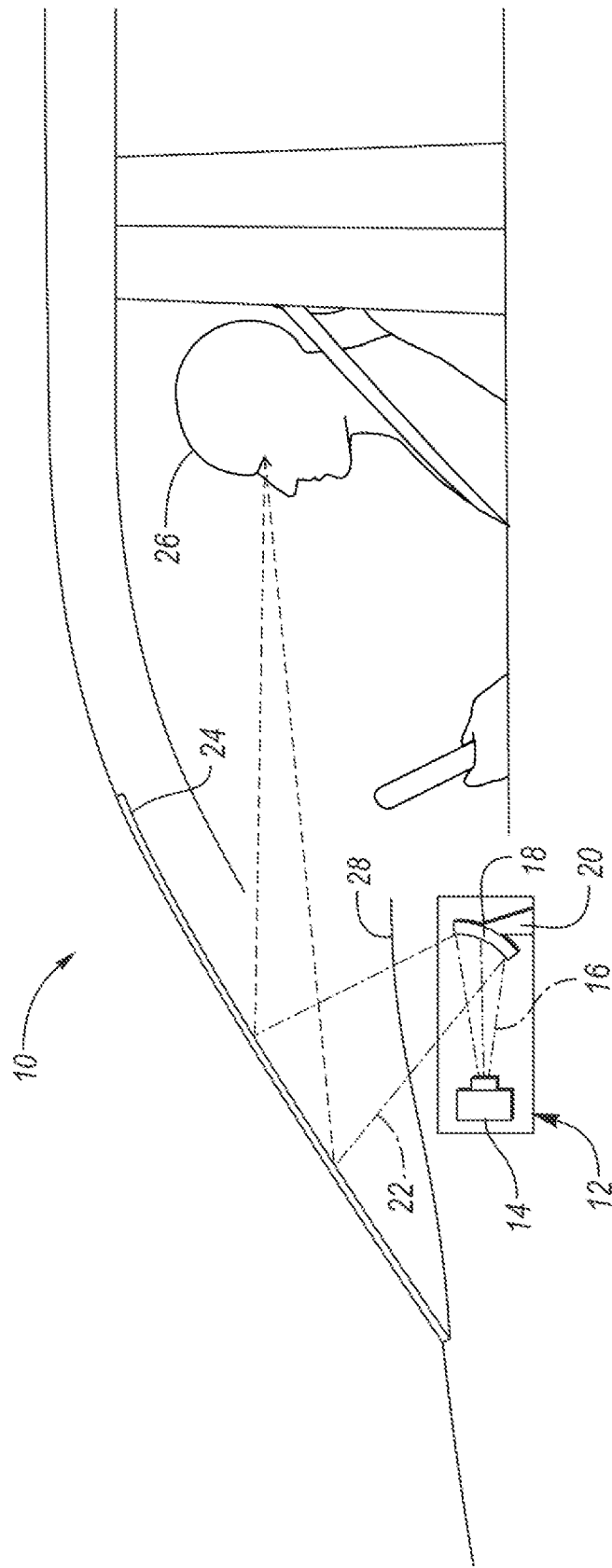
FIG. 1 illustrates a side schematic view of a heads-up display (HUD) system in a vehicle, according to one embodiment.

FIG. 1 illustrates one example of a heads-up display (HUD) system 10. The HUD system 10 is configured for a vehicle, such as a passenger vehicle, car, truck, sports-utility vehicle (SUV), and the like. In other embodiments, the HUD system 10 is implemented in a large track, aircraft, or the like. The HUD system 10 includes a projector unit 12. For simplicity sake, the projector unit 12 is shown herein to have a light source 14, which can be a light-emitting diode (LED) light source for example. Other examples of the light source 14 include a liquid crystal display (LCD), liquid crystal on silicon (LCoS), digital micro-mirrors (DMD), an organic light-emitting diode (OLED), among others. Light transmitted from the light source 14 is shown generally at 16. The light 16 from the light source 14 is reflected off of a mirror 18, which can be concave in shape. The mirror 18 may be fixed via a mirror mount bracket 20, which can allow for tilting or shifting of the image for different driver heights. The light reflected off of the mirror 18, shown generally at 22, is then projected and displayed on a windshield 24 of the vehicle, which acts as a combiner to allow a driver 26 of the vehicle to see external objects through the windshield 24 while also seeing the reflected image from the projector unit 12. In other embodiments, the HUD system 10 includes an extra transparent wall in front of the windshield. The windshield 24 can therefore be referred to as a window, and in other embodiments, the HUD system 10 is configured for a window other than the windshield 24, such as a window of a door, a rear window of the vehicle, a protruding transparent surface in front of the windshield 24, or other such glass or transparent protective structure. To pass to the windshield 24, the light 22 may have to travel through an opening or transparent layer of a dashboard 28 of the vehicle.

The projected image is collimated by the mirror 18, which can make the light rays close to parallel. Because the light rays are close to parallel, the lens of the human eye may focus at extreme distances to get a clear image. Collimated images on the windshield 24 (acting as a combiner) are perceived as existing at far distances. This means that the eyes of the driver 26 do not need to refocus to view the outside world and the displayed image. Instead, the image appears to be "out there" and overlaying the outside world instead of on a fixed position on the windshield 24 itself. The driver 26 can remain focused on the outside world and the image appearing on the windshield 24 will remain in focus for the driver 26.

Several components of the HUD system 10, such as the projector unit 12 and the mirror 18, are placed beneath the dashboard 28 of the vehicle. In order to allow the light 22 to pass through the dashboard 28 and onto the windshield 24, the dashboard 28 may be provided with an opening in the area Where the light 22 is present. The HUD system 10 may therefore also be provided with a transparent cover (e.g., glass, plastic, etc.), also referred to as a dust cover (explained below with reference to FIGS. 2-3) that mates to the underside of the dashboard 28. The HUD system 10 may be designed to assure that no water or other contaminants are able to penetrate through the opening in the dashboard 28 and into the HUD system 10 beneath the cover, as damage could occur.

Therefore, according to embodiments described herein, the HUD system 10 is provided with a protective structure that may be designed to inhibit or prevent water from entering into the components of the HUD system 10 beneath the dashboard 28. As will be described below, the HUD system 10 may have a window plate attached to a cover in a specific manner such that adhesives may not be necessary. Also, the outer edge of the cover may overlay the underlying window plate such that any water rolls over the edge of the cover and into an underlying irrigation trough rather than the interface between the cover and the window plate. The window plate may include a trough to channel and irrigate the water that rolls off the edge of the cover, to remove the water from pooling and inhibit the water from collecting in the interface.

Figure 2:
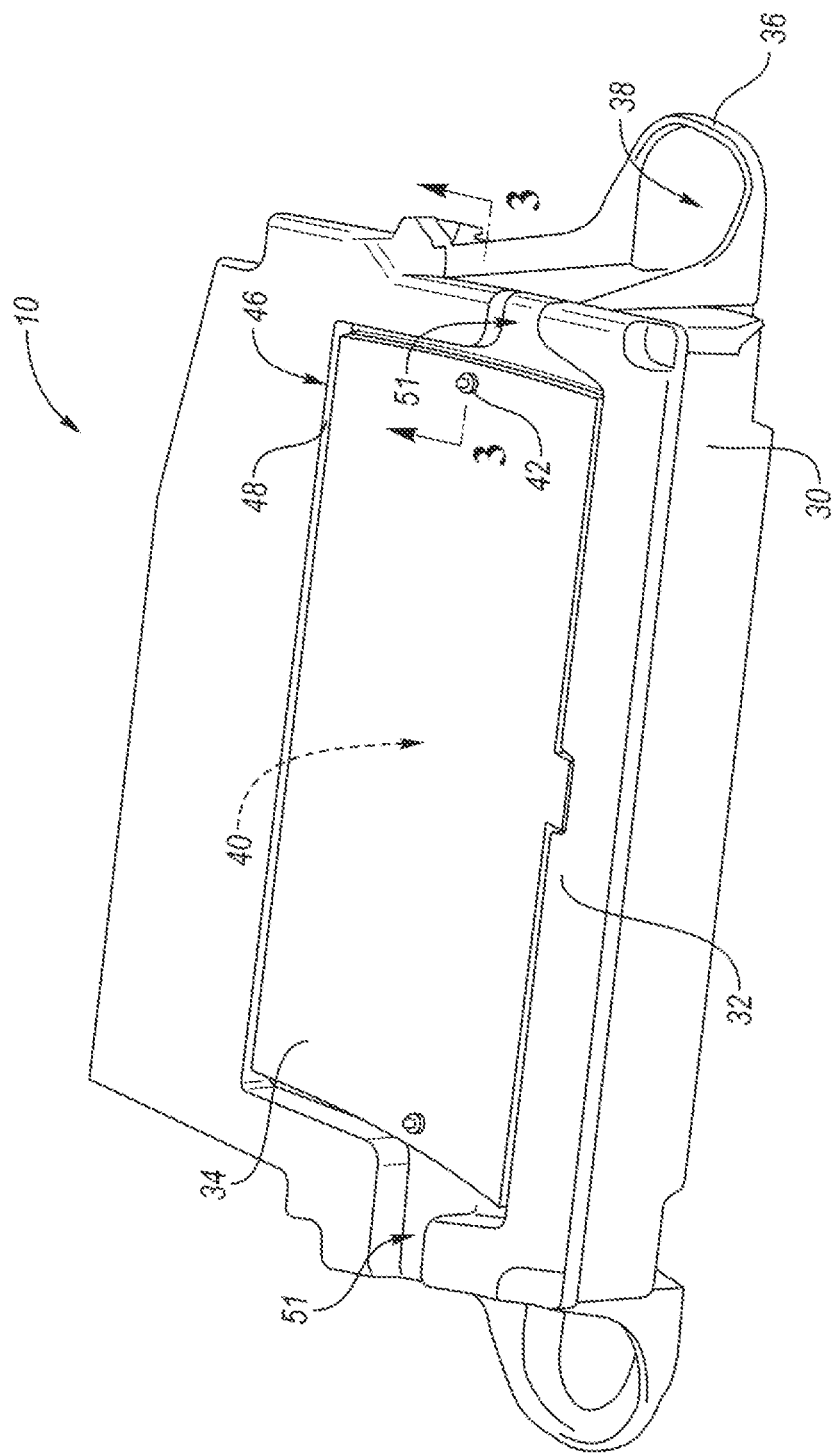
FIG. 2 illustrates a top perspective view of a housing of the HUD system, including a main case, a window plate, and a cover assembled together, according to one embodiment.
Figure 3:
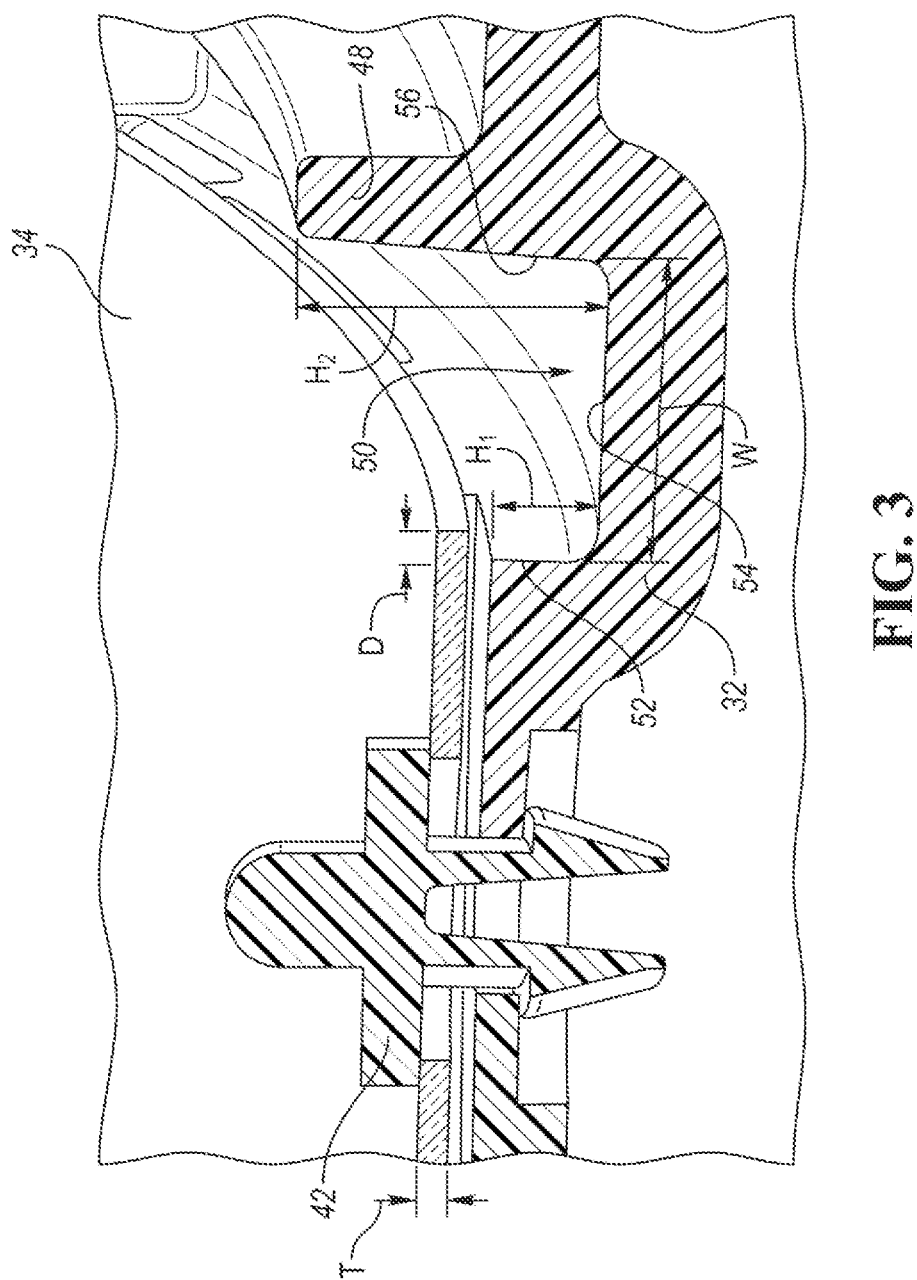
FIG. 3 illustrates a cross-sectional view taken along line 3-3 in FIG. 2, according to one embodiment.

FIGS. 2-3 illustrate an embodiment of these concepts, and more. Outer housing components of the HUD system 10 are shown in FIG. 2, including a main case 30, a window plate 32, and a cover 34. The main case 30 is mounted to an underlying structure (not shown) of the vehicle via flanges 36 having openings 38 configured to receive a fastener, such as a bolt, screw, and the like.

The window plate 32 is mounted to the underlying main case 30. The window plate 32 has a central opening 40. The internal components of the HUD system 10, such as the light source 14 and the mirror 18, are housed beneath or within the window plate 32 and aligned such that the light 22 reflected off of the mirror 18 is reflected through the central opening 40 toward the windshield 24 via, for example, fasteners 42 such as pins, screws, etc. The central opening 40 is covered by the cover 34, which is connected to the underlying window plate 32. The cover 34 covers an opening in the dashboard, lying directly beneath or continuous with the dashboard 28 to protect the internal components of the HUD system 10 from contaminants such as dust, water, moisture, etc. The cover 34 may be referred to as a dust cover, as it can prevent dust from entering through the central opening 40 and interfering with the internal components of the HUD system 10.

As can be seen in FIG. 2, the window plate 32 can define a recess or pocket sized to receive the cover 34. There exists a gap 46 between a perimeter of the cover 34 and an inwardly-facing surface of the window plate 32. In other words, the cover 34 is located inward of a ledge 48 of the window plate 32 that circumscribes at least a portion of the cover 34 with the gap 46 therebetween. This gap 46 provides a trough 50, shown in more detail in FIG. 3. Since the cover 34 may be exposed to a passenger cabin of the vehicle in an opening in the dashboard 28, liquid (e.g., water, moisture, etc.) may inadvertently contact the cover 34. The trough 50 acts as an irrigation channel for liquid to provide an exit pathway for the liquid rather than allowing the liquid to puddle, pool, or become trapped between the cover 34 and the window plate 32.

As shown in the embodiment of FIG. 2, the gap 46 or trough 50 can extend about the entire perimeter of the cover 34. The window plate 32 may have an upper surface, and the cover 34 may have an upper surface. With the gap 46 or trough 50 circumscribing or surrounding the perimeter of cover 34, no portion of the upper surface of the cover 34 is continuous or flush with the upper surface of the window plate 32; the gap 46 remains therebetween.

In the embodiment shown in FIG. 3, the window plate 32 has three surfaces formed therein that define the trough 50; an inner trough wall or first sidewall 52, a floor 54, and an outer trough wall or second sidewall 56. The first sidewall 52 has a first height $H_1$, the floor 54 has a width W, and the second sidewall 56 has a second height $H_2$. The width W defines a width of the trough 50. The second height $H_2$ is taller than the first height $H_1$ and extends taller than the cover 34. In other words, the window plate 32 surrounding the cover 34 sits higher than the cover 34, or the cover 34 is assembled within an egress or pocket formed within the window plate 32.

In one embodiment, the perimeter of the cover 34 overhangs the first sidewall 52. The overhang can be by a distance D, defining a distance of the overhang or overhang region of the cover 34. The overhang region of the cover 34 extends further from a center of the central opening 40 then the first sidewall 52 and therefore overhangs the first sidewall 52. Thus, at the perimeter of the cover 34, a distance D of the cover 34 is not directly connected to or supported by the window plate 32. The distance D is greater than zero. The overhang facilitates the water to travel over the perimeter of the cover 34 and into the trough. 50 without passing underneath the cover 34 and into the interface between the cover 34 and the window plate 32 where the water can become trapped. In one embodiment, the distance D is at least 0.5 millimeters (mm) to ensure the water does not travel under the cover 34.

If left unprotected, the overhanging perimeter of the cover 34 could increase the likelihood of the cover being broken or damaged if subjected to a large contact Three (e.g., during assembly). This is due to the overhang of the cover 34 not being directly supported from beneath by the window plate 32. Therefore, the window plate 32 is formed with its outer or second wall 56 being taller than the cover 34. In other words, the height $H_2$ exceeds the combined height $H_1$ and thickness T of the cover 34. This gives the second wall 56 a raised profile relative to the cover 34. If a contact force is made with the HUD assembly 10, the height $H_2$ of the window plate 32 will allow the window plate 32 to absorb the force rather than the overhang of the cover 34. In an embodiment, the second wall 56 extends above the cover 34 by at least the thickness T. In an embodiment, the width W of the trough 50 is between two and ten mm (and, in other embodiments, between three and five mm) to provide enough of a gap for the liquid to flow therethrough but not too much of a gap that would leave the overhang of the cover 34 unprotected.

Providing the trough 50 should require a minimum depth sufficient to enable the liquid to flow through the trough 50 rather than allowing the liquid to build up in the trough 50 and seep into the interface between the cover 34 and the window plate 32. To ensure this, in one embodiment, the minimum depth of the trough is at least four mm. In other words, the height $H_1$ is at least four mm. This height is specifically designed to enable liquid to flow in the trough 50 while taking up a minimal amount of packaging space without allowing the liquid to seep into the interface between the cover 34 and the window plate 32.

The trough 50 can also be contiguous with and adjacent to run-off regions 51. The run-off regions 51 are recesses formed in the window plate 32 like the trough 50. The run-off regions 51 are contiguous with and have an equal or similar depth as the trough 50 to enable liquid building up or traveling in the trough 50 to exit the window plate 32 via the run-off regions 51. As such, the run-off regions 51 may be formed at the lowest point of the window plate 32 to enable the collected liquid to escape the window plate 32 due to gravity and run-off the exterior side of the window plate 32.

The overhang of the cover 34 also enables fasteners 42, rather than adhesives, to be utilized to connect the cover 34 to the underlying window plate 32. Adhesives can corrode, especially when subjected to liquid or other contaminants. Prior connections between covers and underlying window plates utilize adhesives in or around the perimeter of the cover. However, since the cover 34 of this disclosure has an overhang region, adhesives may not be suitable in these regions. Utilizing fasteners 42, rather than adhesives, provides a less likelihood of corrosion while still enabling the cover 34 to connect securely to the window plate 32. Moreover, fasteners 42 provide an easier ability to remove the cover 34 to access the underlying HUD components compared to an adhesive. Although fasteners 42 are utilized to connect the cover 34 to the underlying window plate 32, in various implementations, adhesives may be utilized to connect the cover 34 to the underlying window plate 32.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A heads-up display (HUD) assembly comprising:
 a main case;
 a window plate connected to the main case, the window plate defining an opening configured to enable light emitting from HUD components to pass therethrough, the window plate further including an inner trough wall and an outer trough wall that define a trough therebetween that at least partially surrounds the opening; and
 a transparent cover attached to the window plate and covering the opening, the cover having a perimeter and an overhang portion located along at least a portion of the perimeter, wherein the overhang portion extends beyond the inner trough wall and is not directly supported from beneath by the window plate.

2. The HUD assembly of claim 1, wherein the overhang portion extends beyond the inner trough wall by at least 0.5 millimeters.

3. The HUD assembly of claim 1, wherein the inner trough wall has a first height, and the outer trough wall has a second height exceeding the first height.

4. The HUD assembly of claim 3, wherein the second height exceeds a sum of the first height and a thickness of the cover such that the outer trough wall has a raised profile compared to the cover.

5. The HUD assembly of claim 1, wherein the trough has a width in a range of 2 to 10 millimeters.

6. The HUD assembly of claim 1, wherein the trough has a depth defined between a floor of the trough and the inner trough wall, wherein the depth is at least 4 millimeters.

7. The HUD assembly of claim 1, wherein no adhesives are provided to attach the cover to the window plate.

8. A heads-up display (HUD) assembly comprising:
 a cover having a perimeter; and
 a window plate supporting the cover from beneath, the window plate having a trough defined about at least a portion of the perimeter of the cover, wherein the trough has an outer trough wall that has a raised profile compared to the cover.

9. The HUD assembly of claim 8, wherein the outer trough wall extends higher than the cover such that the cover is recessed within the outer trough wall.

10. The HUD assembly of claim 8, wherein the window plate further includes an inner trough wall that, in combination with the outer trough wall, forms the trough, wherein the inner trough wall is shorter than the outer trough wall.

11. The HUD assembly of claim 10, wherein the outer trough wall has a height that exceeds a sum of a height of the inner trough wall and a thickness of the cover.

12. The HUD assembly of claim 10, wherein the perimeter of the cover overhangs the inner trough wall to cover at least a portion of the trough.

13. The HUD assembly of claim 12, wherein the perimeter of the cover extends beyond the inner trough wall by a distance of at least 0.5 millimeters.

14. The HUD assembly of claim 8, wherein the cover has an upper surface and the window plate has an upper surface, and a gap exists between an entity of the perimeter of the cover and the window plate such that no portion of the upper surface of the cover is flush or continuous with the upper surface of the window plate.

15. A vehicular heads-up display (HUD) system comprising:
 a window plate defining an opening configured to enable light emitting from HUD components to pass therethrough, the window plate including an inner trough wall and an outer trough wall that cooperate to define a trough therebetween that at least partially surrounds the opening; and
 a transparent cover attached to the window plate and covering the opening, the cover having a perimeter and an overhang portion located along at least a portion of the perimeter, wherein the opening has a center and the overhang portion extends further from the center than the inner trough wall to facilitate liquid traveling across the cover to enter the trough and inhibit the liquid from entering an interface between the cover and the window plate.

16. The vehicular HUD system of claim 15, wherein the overhang portion of the cover is not directly supported from beneath by the window plate.

17. The vehicular HUD system of claim 15, wherein:
the inner trough wall has a first height;
the cover has a thickness;
the outer trough wall has a second height; and
the second height exceeds a sum of the first height and the thickness of the cover such that the outer trough wall has a raised profile compared to the cover.

18. The vehicular HUD system of claim 15, wherein the trough includes a floor and the window plate defines a run-off region that has a floor contiguous with the floor of the trough and travels downward to facilitate a run-off of liquid traveling in the trough.

19. The vehicular HUD system of claim 18, wherein the trough has a depth that is equal to a depth of the run-off region.

20. The vehicular HUD system of claim 15, wherein the overhang portion extends beyond the inner trough wall by at least 0.5 millimeters.

* * * * *